C. LOBDELL.
Cultivator and Seeder.
No. 84,499. Patented Dec. 1, 1868.
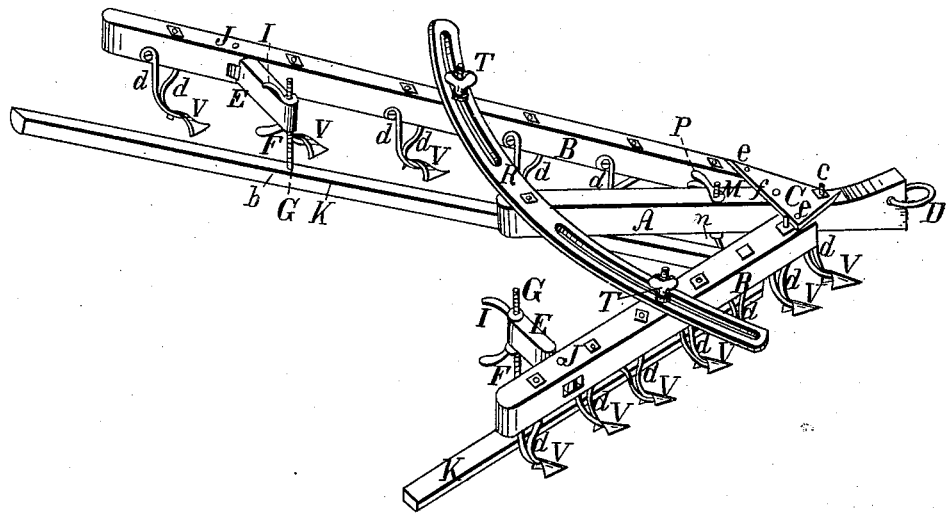
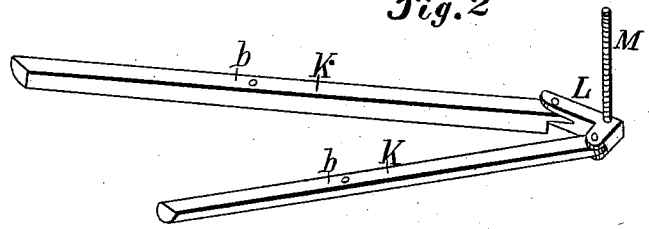
Witnesses,
A. Hayward
J. P. Bryant
Inventor,
Calvin Lobdell.
By his attorney
G. L. Chapin

CALVIN LOBDELL, OF FORT HILL, ILLINOIS.

Letters Patent No. 84,499, dated December 1, 1868.

IMPROVEMENT IN CULTIVATOR AND SEEDER.

The Schedule referred to in these Letters Patent and making part of the same.

*To all whom it may concern:*

Be it known that I, CALVIN LOBDELL, of Fort Hill, in the county of Lake, and State of Illinois, have invented an Improved Cultivator and Leveller; and I do hereby declare that the following is a full, clear, and exact description of the construction and operation of the same, reference being had to the accompanying drawings, and letters marked thereon, making a part of this specification, in which—

Figure 1 is a perspective representation of my invention.

Figure 2, a perspective representation of the leveller detached from the cultivator.

The nature of the present invention consists in attaching to an adjustable cultivator a leveller, which is also adjustable, and arranged to run between the shovels, and smooth the surface of the soil after it has been stirred, and to gauge the depth which the shovels are to run in the ground.

To enable others skilled in the art to make and use my invention, I have marked corresponding parts with similar letters, and will now give a detailed description.

A represents the draught-beam of the cultivator, which is made of wood, and extends back to a segment-plate, R, and it has pivoted to it two side wings B B, by means of bolts $e$ $e$, passing through a plate, C, and through the forward ends of said wings, as shown at fig. 1, the plate being secured to the draught-beam A by bolts $c$ $f$.

Such a number of shear-shovels, V V, &c., are used as will till the whole surface of the soil over which the cultivator passes, and each shovel has two shanks, $a$ and $d$, the former being bolted to the insides of the wings B B, and the latter passing through them, and held in place by nuts or other suitable fastenings.

A circular plate, R, is bolted fast to the rear end of the draught-beam A, and it has slots S S made vertically through it, in which bolts, projecting upward from the wings B B, are put, said bolts having screw-threads on their upper ends, on which nuts T are turned, to hold the wings in position when they have been adjusted to till a given width of soil.

K K represent the wings of a leveller, which may either be made of two bars of iron, of suitable size, or of wood shod with iron, as most convenient, and their outer edges may be curved upward, as shown in the drawings, to run over and pulverize clods, or their under sides may be flat, to shear the surface of the ground, as the nature of the work to be done may require.

The forward ends of these wings are pivoted to a substantial metal nose-piece, L, which is pointed at the front end, and it has attached to it a strong rod, M, which passes through the draught-beam A, and is made adjustable by means of nuts $n$ and P, at the under and upper sides of said beam, the rod M having a screw-thread cut on it, that the front end of the leveller may be raised and lowered.

Rods G G, having screw-threads on them, are rigidly attached to the wings K K, at $b$ $b$, and they pass through arms E E, and are also adjustable by means of nuts F I turned on the rods G G, at the opposite sides of the arms, as shown at fig. 1. These arms are made of wood or other suitable material, and they are pivoted to the wings B B, at J J, by which means the wings K K will be carried to or from each other, as the case may be, when the wings B B are adjusted.

Operation.

The leveller can be set such a distance above the under edges of the shovels as they are to run in the ground, after which the nuts T T can be loosened, and the wings B B adjusted to cultivate the required width. The nuts are then tightened, and the cultivator is ready for use.

When the cultivator is to be moved to or from a field, the leveller can be adjusted below the shovels, so as to ride on the ground without cultivating, or the wings B B may be closed, as when stored away, and loaded on a wagon.

Having thus described my invention,

What I claim, and desire to secure by Letters Patent, is—

1. The leveller K K L, arranged to operate substantially as and for the purpose herein specified.

2. The combination of the leveller K K L, arms I, wings B, rods M G, and curved plate R, the whole being constructed and arranged substantially as and for the purpose set forth.

CALVIN LOBDELL.

Witnesses:
    GEO. L. CHAPIN,
    A. HAYWARD.